United States Patent [19]

Rash, Jr. et al.

[11] 3,730,735

[45] May 1, 1973

[54] CONFECTION AND METHOD OF MANUFACTURE

[75] Inventors: Kenneth E. Rash, Jr., Pleasanton, John C. Colmey; Charles E. Zanzig, both of Danville, all of Calif.

[73] Assignee: Foremost-McKesson, Inc., San Francisco, Calif.

[22] Filed: Feb. 23, 1971

[21] Appl. No.: 118,045

Related U.S. Application Data

[63] Continuation-in-part of Ser. No. 807,280, March 14, 1969, abandoned.

[52] U.S. Cl. ................................................99/134 R
[51] Int. Cl. ................................................A23g 3/00
[58] Field of Search .....................99/19, 57, 134 R

[56] References Cited

UNITED STATES PATENTS 2,699,995   1/1955   Hull..........................................99/19

3,447,930   6/1969   Francis......................................99/57

OTHER PUBLICATIONS

Progress in Candy Research, USDA–SRRL Report Confectioner's Journ. 77 (917); June, 1951 pp. 14, 18 and 20.
Alesch, Utilization of Whey Solids in Food Products, Journ. of Dairy Sci. Vol. 41:5 May 1958, pp. 699–700.

*Primary Examiner*—Raymond N. Jones
*Assistant Examiner*—J. M. Hunter
*Attorney*—Flehr, Hohbach, Test, Albritton & Herbert

[57] ABSTRACT

Confection or candy mixes and products having relatively high levels of solubilized protein obtained by using partially delactosed and partially demineralized whey having an ash content of not more than about 6.5 percent in combination with a soluble caseinate.

6 Claims, 1 Drawing Figure

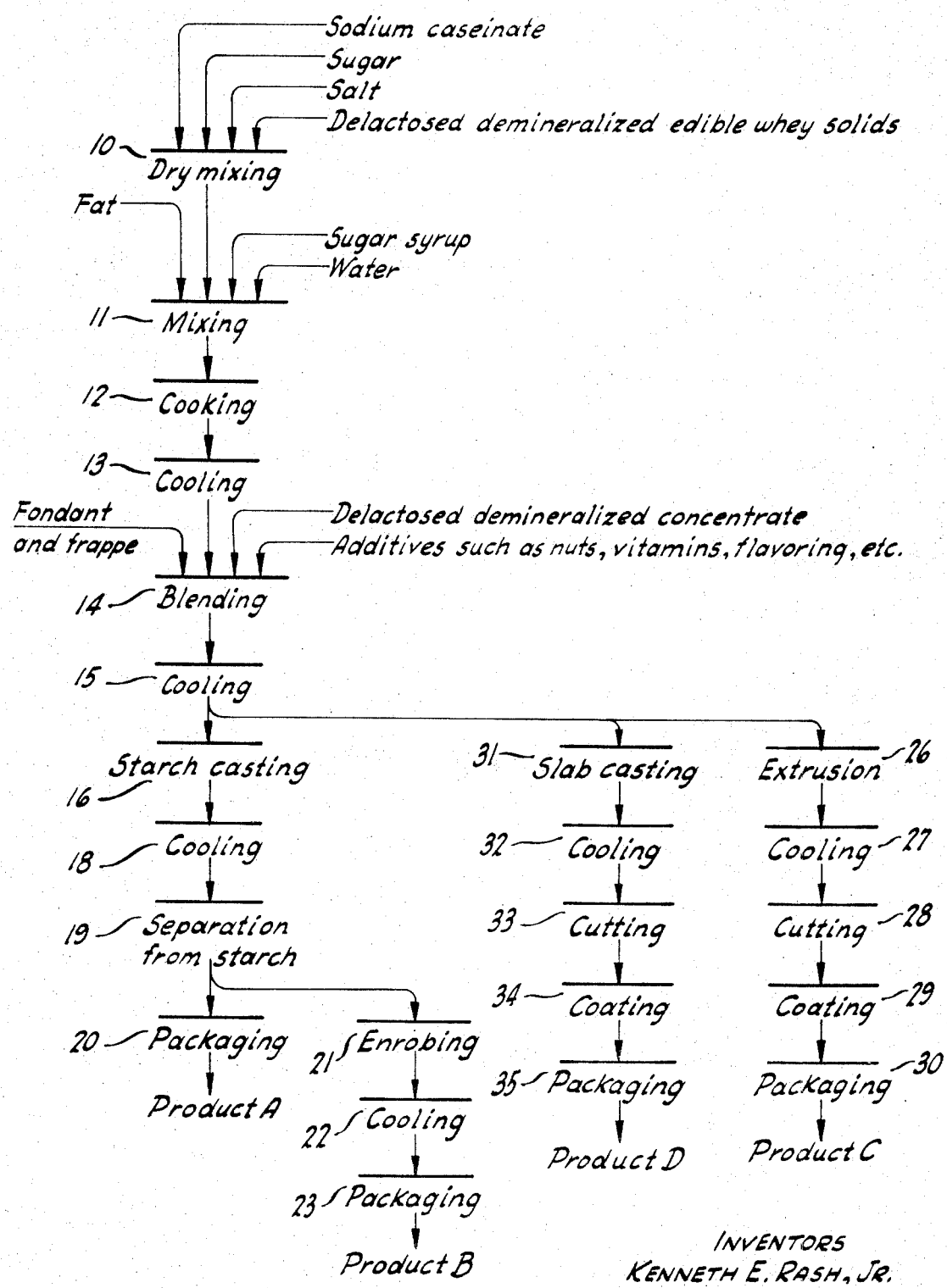

CONFECTION AND METHOD OF MANUFACTURE

CROSS-REFERENCE TO RELATED APPLICATIONS

This application is a continuation-in-part of copending application Ser. No. 807,280, filed Mar. 14, 1969 now abandoned, for CONFECTION AND METHOD OF MANUFACTURE. Reference is also made to U.S. Pat. Nos. 2,730,768, 2,731,411, 2,800,445, showing electrodialysis equipment, U.S. Pat. No. 3,447,930 showing a method for producing electrodialyzed whey, and U.S. Pat. No. 2,088,606 showing a method for the spray drying of a discrete whey powder in hydrate form.

BACKGROUND OF THE INVENTION

Various formulas for the manufacture of confections or candies have included milk solids in the form of liquid, condensed or powdered nonfat milk (i.e., skim milk), whole milk or cream to provide improved food value, texture and flavor. In such formulas, the milk content provides some solubilized protein at low levels of the order of 2 to 7 percent of the total weight. Because of the cost of such forms of milk solids, which presently is increasing, it has been proposed to substitute less expensive edible grades of whey, such as are now available on the market. Aside from the reduced protein content afforded by whey as compared to skim milk, whole milk or cream, it has been found that such substitution materially impairs the quality of the confection, having reference particularly to flavor, texture and color. Thus, whey has not been used to any extent in confections or candies of the fudge type, and to only very low levels in candies of the caramel type which do not have a crystalline or grained texture.

In our copending application Ser. No. 807,280, of which this application is a continuation-in-part, we have disclosed confections and methods of manufacture making use of electrodialyzed whey having an ash content substantially less than normal whey. This makes possible confections having protein levels of the order of 1 to 7 percent, without the disadvantages attendant upon the use of ordinary whey.

Protein derived from milk or whey is dispersed and solubilized in the form of a colloid or gel, as distinguished from protein in such additives as soybean meal, nuts and the like, which are frequently added to candy or confections. The protein content of whole milk or non-fat milk is largely casein, whereas the protein content of whey is mainly lactalbumin and lactoglobulin. Also, the protein content of whey has substantially zero moisture absorptivity and, therefore, substantial amounts of whey may be introduced into a confection mix without a substantial decrease in fluidity. Use of whey or demineralized whey in substantial amounts as disclosed in copending application Ser. No. 807,280, involves use of higher than normal cookout temperatures.

There is a practical limit to the protein levels that can be obtained by use of whey or other milk solids, including electrodialyzed whey. Thus, it is not deemed practical to use amounts of milk solids or whey to obtain protein levels in excess of about 10 percent. Thus, there is a need for a confection and method of manufacture which makes possible relatively higher levels of good quality dispersed protein. An ideal high protein confection should have a solubilized protein level of the order of about 16 to 24 percent, thus providing a food which is dietetically equivalent or possibly superior to the instant breakfast products now being sold to the consumer trade. This need cannot be met by the use of whole milk, non-fat milk, conventional whey, or electrodialyzed whey, because as pointed out above there is a practical limit to which these ingredients can be added to confection formulas, while maintaining desirable body, texture and stability.

SUMMARY OF THE INVENTION AND OBJECTS

This invention relates generally to confections or candies and particularly to such products having a relatively high protein level. It also pertains to methods for the manufacture of such confections.

In general, it is an object of the invention to provide a confection or candy formulation which includes a novel combination of solubilized protein containing ingredients, and which can be used to produce various high quality confections or candies having a relatively high level of protein.

Another object of the invention is to provide a novel method for the manufacture of high protein confections.

In general, the present invention involves the use of both demineralized whey and a soluble caseinate, such as sodium caseinate. These two ingredients when used in combination make possible new and unexpected results, including attainment of higher protein levels, use of lower cookout temperatures, and retainment of desired nutrient values.

Additional objects and features of the invention will appear from the following description in which the preferred embodiments have been set forth in detail in conjunction with the accompanying drawing.

BRIEF DESCRIPTION OF THE DRAWING

The single FIGURE of the drawing is a flow diagram illustrating steps for carrying out the present invention.

OF THE PREFERRED EMBODIMENTS

The present invention involves the use of whey which has been processed to reduce its lactose and ash contents. Commercial edible whey such as is produced in the production of cheddar cheese has an ash content of the order of 8.5 to 9.0 percent (dry solids basis), and a lactose content of about 72 percent. By virtue of its lactalbumin and lactoglobulin content, whey is a source of good quality edible protein. The protein content of whey solids can be increased to levels of the order of 15 to 35 percent by removing varying amounts of the lactose. Also, the mineral salt content of whey can be substantially reduced, as by electrodialysis, with a corresponding reduction in ash and an increase in protein contents. In the present invention such demineralized and partially delactosed whey is used in combination with a good quality dispersable protein, particularly a caseinate (e.g., sodium caseinate) to attain the protein level desired. The combination of partially demineralized and partially delactosed whey and caseinate has unexpected advantages as will be presently explained.

Edible whey products suitable for use in the present invention can be produced by use of electrodialysis equipment consisting of a plurality of membrane stacks connected in series, with the whey flowing through ducts concurrently to a brine stream. Suitable equipment for this type is manufactured by Ionics, Inc. (see U.S. Pat. Nos. 2,730,768, 2,731,411, and 2,800,445). Also use can be made of the electrodialysis method and equipment disclosed in U.S. Pat. No. 3,544,436, issued Dec. 1, 1970. Preparatory to electrodialyzing, it is desirable to concentrate the whey by evaporation to produce a concentrate ranging from 20 to 26 percent solids, and with a hydrogen concentration ranging from about pH 5.0 to 5.5. While the whey may be neutralized, it is desirable to maintain it slightly acid for reasons to be presently explained. As disclosed in U.S. Pat. No. 3,447,930, it is desirable to subject the concentrate to clarification as by heating to a temperature of the order of 150° F. for a period of about 5 to 10 minutes, after which the concentrate is subjected to centrifuging for the purpose of removing any coagulated solid fragments or curd.

In practice, electrodialysis may be applied to effect removal of from about 25 to 90 percent or more of the mineral salt content. Assuming that the ash content before being electrodialyzed is of the order of from 8.5 to 9.0 percent, then the electrodialyzed whey may have an ash content of the order of from 0.9 percent to 6.5 percent.

While we prefer to use a partially delactosed whey that has been electrodialyzed, it is possible to use partially delactosed edible whey that has been demineralized by other methods, such as contact with ion exchange resins, by both electrodialyzing and contact with ion exchange resins, or by ultrafiltration.

In general, use of a low or medium heat whey without further denaturation during processing has been found to produce an electrodialyzed product suitable for use in the present invention, although high heat wheys are likewise deemed to be applicable.

Although it is convenient to use a liquid whey concentrate that has been partially delactosed and electrodialyzed, it may be more practical to convert the liquid concentrate to the form of whey powder. This can be carried out by use of conventional spray drying equipment wherein the liquid concentrate is atomized in a chamber where the atomized particles are dispersed in a drying gas (see U.S. Pat. No. 2,088,606). Preferably, the drying conditions are maintained such that the divided product from the drying chamber has a moisture content of the order of 12 to 18 percent. This moist discrete material is then subjected to secondary drying to produce the final product having a moisture content of the order of 4 to 6 percent. The lactose content of such a whey powder is largely in the hydrate form. In some instances, for the convenience of candy manufacturers, the whey may be provided in sweetened condensed form, in which event the sugar content is taken into account in formulating the confection mix.

The process of U.S. Pat. No. 3,447,930 can be employed to remove the desired amount of lactose and to demineralize by electrodialysis to a desired residual level of ash. Such partially delactosed and demineralized whey may have a lactose content of from 45 to 65 percent, a residual ash content of from 0.9 to 6.5 percent, and a protein content of from 18 to 35 percent.

The soluble caseinate employed should be a good quality protein which has not been subjected to previous processing tending to cause serious degradation. It should be readily soluble in water to form a colloid or gel, without imparting an undesirable flavor. Generally, it is desirable to use sodium caseinate, although for dietetic purposes, other soluble caseinates can be used, such as calcium caseinate or potassium caseinate. A suitable sodium caseinate can be produced by solubilizing freshly precipitated acid casein with sodium hydroxide solution, followed by spray drying.

Our method makes use of mixing, cooking and handling techniques which are generally known in the confection industry. However, the method differs in a number of respects from conventional techniques, including the use of demineralized whey and a soluble caseinate, in combination.

The flow sheet of the drawing illustrates one suitable procedure for carrying out the method. The dry ingredients, including particularly sugar and sodium caseinate, and preferably at least some of the dry whey solids, are mixed or blended in Step 10. The resulting dry blend is further mixed or blended in Step 11 with fat and sugar syrup. Water may also be added at this point in sufficient amount to provide the desired solids concentration. The fat employed may be butter fat, or any suitable edible fat, including both natural and hydrogenated fats. The total water content of the mix produced in Step 11 before cooking, may be about 25 to 35 percent.

In the next cooking Step 12 the mix is heated to temperature levels such that some of the water content is continuously removed by evaporation, whereby at the end of the cooking step the mix has a proper moisture content (e.g., 12 to 15 percent) for further processing. Cooking is on an increasing temperature gradient corresponding with the increasing boiling point of the mix, as the mix becomes more concentrated. In general, it is desirable to carry out cooking at temperatures well below conventional candy practice. For example, as compared to conventional candy practice using cookout temperatures of from 235° to 265° F., we prefer to use cookout temperatures of about 227° to 235° F.

Following cooking the mix is subjected to cooling 13, to reduce its temperature to about 180° to 210° F., but with a maintenance of sufficient fluidity to permit blending in of additional ingredients at this point. In the following blending operation 14, it is desirable to introduce additives such as indicated. Particularly for reasons to be presently described, it is desirable to introduce a part of the demineralized whey, in addition to that part introduced in the mixing Step 10. To facilitate dispersion in the mix, it is desirable that the whey introduced at this point be previously slurried with fat or water, to produce a concentrate as indicated. Also additives such as nuts, vitamins and the like, can be introduced. In addition, if a candy of the fudge type is being made, a fondant or frappe can be introduced as indicated. Introduction of fondant at this time serves to seed crystallization of sugar to produce a desired texture in the final product.

The mix from Step 14, which may now be at a temperature level of the order from 150° to 180° F., is subjected to further cooling in Step 15, which may reduce the temperature to about 85° to 90° F. with increase in viscosity to provide a consistancy suitable for starch casting, slab casting, or extrusion.

Further processing operations for producing various final products are indicated in the drawing. Thus to produce a caramel product A, the mix from Step 15 without the indicated possible addition of nuts, fondant and frappe, is supplied to the starch casting operation 16, which can be carried out by a conventional starch casting machine. After casting and before removal from the starch molds, the mix is subjected to cooling 18 to ambient room temperature, after which the solidified mix is separated from the starch in Step 19, and packaged in Step 20 to produce the final product A. If a fudge-type confection is desired, fondant and frappe can be introduced in Step 14.

Assuming that the product is to be used as a central caramel or fudge core for a candy bar, the masses removed in Step 19 can be subjected to a coating or enrobing operation 21 followed by cooling 22 to solidify the coating, and packaging 23 to produce product B.

To produce product C, the mix from Step 15 as shown being subjected to extrusion 26 followed by cooling 27 to ambient room temperature, cutting 28 to pieces of suitable size, coating 29 and packaging 30 to produce product C.

To produce product D, the mix from Step 15 as shown subjected to slab casting 31, cooling 32 to ambient room temperature, and cutting 33 to pieces of suitable size, after which the pieces can be coated at 34 and packaged at 35.

Because sodium caseinate, or other soluble caseinate, possesses the property of relatively high water absorptivity, its introduction before cooking serves to substantially increase the viscosity of the mix, compared to the same mix of like sugar content without the sodium caseinate. On the other hand, demineralized whey has relatively low water absorptivity, and its introduction into the mix does not materially increase viscosity. Assuming that the demineralized whey is slightly acid as is preferred, its introduction into the mix tends to somewhat decrease viscosity, or in other words, to increase fluidity of the mix at a given cooking temperature and concentration. When the demineralized whey solids and the sodium caseinate are used in combination to attain a desired high protein level, viscosity at a given processing level does not become excessive, even though cooking is carried out at relatively low temperature levels. Actually the use of relatively low cooking temperatures, with cookout at a temperature level of from about 227° to 235° F., is desirable. Ingredients of the mix tend to be injured or degraded at the temperatures and over the cooking times involved. For example, with our process cooking to provide a cookout temperature well above 235° F., would tend to degrade the protein present. At the lower temperature levels of the order of 235° F. or less, such degrading of the protein present is minimized over the time period of cooking and subsequent cooling.

In the flow sheet, demineralized whey solids are shown being introduced at two points, namely in the dry mixing Step 10, and in the blending Step 14. The reason for this is that the lysine content of the mix introduced before cooking, tends to be destroyed during the cooking operation, due presumably to the complexing of the lysine with the reducing sugars present in the mix, at the temperatures involved. However, whey introduced into the blending operation 14 is subjected to lower temperatures than the cookout temperature, and the short time lapse before further cooling in Step 15 is such that there is no serious destruction or impairment of the lysine content. Thus, to the extent that lysine is desired in the final product, it may be introduced by adding some (e.g., 20 to 50 percent) of the whey after cooking and after preliminary cooling, or by direct lysine supplementation after preliminary cooling.

It is desirable to form a slurry of the demineralized whey with hot water, before introduction into the blending operation 14. This serves to facilitate homogeneous dispersion with the other ingredients in Step 14. Instead of slurrying the whey with hot water, it may be homogeneously mixed with a hot concentrated sugar syrup, and then introduced into the Step 14.

The term sugar as used herein is intended to include all of the sugars commonly used in the confection industry. Such sugars are saccharides of vegetable origin and include sucrose, invert corn sugar, corn syrup, dextrose, unconverted dextrines, glucose, levulose and maltose and such sugars together with the lactose present and higher saccharides in the flours employed provide a substantial portion of the carbohydrate content of the final products. While lactose is a sugar, it is not of vegetable origin and it is not deemed to be a confection "sugar" as this term is used herein. Also higher saccharides in the flours are not deemed to be confection sugars.

With respect to overall proportioning of the ingredients, it may be stated that the sugar content of the confection, ignoring additives such as nuts, etc., is of the order of 45 percent or more of the total weight of the basic confection. The amount of partially delactosed demineralized whey solids employed may range from about 25 to 45 percent of the sugar (i.e. saccharide) content. The amount of soluble caseinate employed may range from about 15 to 30 percent of the sugar content. The cookout temperatures employed preferably should not be in excess of about 235°, and may range from about 227° to 235° F. The time period for cooking may range from about 30 to 40 minutes. The amount of fat employed may vary in accordance with the type of confection to be made, but in general may range of from about 15 to 30 percent of the sugar content. The final moisture content of the confection may range of from about 8 to 12 percent, for the common types of solid confections, and may be somewhat higher for toppings and like products.

Our invention makes possible confections of excellent quality which provide a balanced diet. As previously mentioned, it is possible to provide protein levels of the order of 16 to 24 percent, with the protein being solubilized in the water content of the product. Higher protein levels can be obtained for special products by addition of discrete solid protein containing materials, such as soybean meal or nuts. Because of the high protein levels such products can be said to be generally equivalent to so-called instant breakfast products, insofar as supplying a balanced diet is concerned.

The confection products are characterized by long shelf life without deterioration. This characteristic is attributed to the presence of the partially delactosed and demineralized whey. Particularly, products of the fudge type retain a desired texture and softness over long periods of storage at ambient room temperatures, without hardening.

When ordinary whey solids are used in confection mixes, there is a noticeable masking of intended flavor. Thus, flavor intensity may be reduced or a particular flavor altered or modified. In contrast, demineralized whey does not have such flavor masking effect and therefore flavor components are not modified or impaired but are enabled to have a maximum flavor effectiveness.

In the foregoing, we have referred to use of partially delactosed demineralized whey having a hydrogen ion concentration corresponding to pH 5.0 to 5.5. This type of whey results from demineralization and removal of a part of the lactose of cheddar cheese whey without neutralization, followed by spray drying. As previously mentioned, the presence of such whey in the cooking operation tends to produce the desired fluidity of the mix during cooking and in the subsequent steps preceding blending at 14. It should be understood, however, that neutralized and demineralized whey can be employed, and in such event small amounts of an acid, such as phosphoric or hydrochloric acid or an organic acid such as lactic or citric acid can be added to the mix immediately prior to cooking, for the purpose of maintaining a desired fluidity.

Previous reference has been made to the fact that we prefer to add a part of the partially delactosed and demineralized whey in the mixing Step 10, and the remaining part in the blending Step 14. This prevents substantial destruction of all of the lysine content, which otherwise might occur if all of the whey were introduced into the mixing Step 10. It should be understood, however, that in instances of where the destruction of lysine is of no importance, or where additional controlled amounts of lysine are introduced into the product as in Step 14, all of the demineralized whey can be added in Step 10 before the cooking step. It is not desirable to introduce all of the demineralized whey into Step 14, instead of introducing at least part in Step 10.

EXAMPLE 1

The following is an example of a caramel type candy produced by our process.

The ingredients in the finished confection were as follows:

| | |
|---|---|
| Sucrose | 23.2% |
| Corn Syrup | 26.2 |
| Partially delactosed and demineralized cheddar cheese whey having 90% of its mineral content removed by electrodialysis and with a lactose content of 53% | 15.0 |
| Sodium caseinate | 9.2 |
| Defatted sesame flour | 2.5 |
| Defatted soy flour | 2.4 |
| Vegetable oil | 8.0 |
| Salt | 1.1 |
| Dicalcium phosphate | 2.0 |
| Water | 10.4 |

The gross composition was as follows:

| | |
|---|---|
| Protein | 16.4 |
| Carbohydrate | 54.6 |
| Fat | 8.4 |

The dry ingredients, namely, sodium caseinate, sugar, salt and demineralized whey, were blended together. Corn syrup and water were blended preparatory to introducing these ingredients into Step 11. This blend was then slowly mixed with the dry ingredients, in Step 11. After melting the hydrogenated vegetable oil at 150° F., it was introduced into Step 11 and intermixed with the other ingredients. This batch was then cooked in a steam jacketed kettle, over a period of about 30 minutes with a cookout temperature of about 227° F., and then in Step 14 it was intermixed with the remaining ingredients, such as flavoring, vitamins, minerals and lysine as desired. The batch was then cooled to about 90° F. and deposited in trays, after which it was cooled to ambient room temperature.

The resulting candy product was a chewable consistency, with a protein level of about 16.5 percent. The flavor and texture was excellent, and when stored at ambient room temperature over periods of the order of 12 months, there was no noticeable change in quality or texture.

EXAMPLE 2

The following is an example of a candy bar made according to our process and containing added peanuts. The same procedure was employed as in Example 1, to the point of producing the blend in Step 14. The peanuts were added in this blending step in an amount of about 38 percent of the total mix. The remaining steps followed were the same as in Example 1. The addition of peanuts increased the protein content of the final product to the level of about 22 percent.

EXAMPLE 3

The following procedure was used for making a high protein chewable fudge bar.

The ingredients in the finished confection were as follows:

| | |
|---|---|
| Sucrose | 24.0% |
| Corn Syrup | 11.0 |
| Partially delactosed and demineralized edible cheddar cheese whey having an ash content of 2.5% and a lactose content of 53% | 15.0 |
| Sodium caseinate | 9.2 |
| Vegetable oil | 8.0 |
| Defatted sesame flour | 2.5 |
| Defatted soy flour | 2.4 |
| Salt | 1.1 |
| Dicalcium phosphate | 2.0 |
| Water | 8.0 |
| Fondant | 11.5 |
| Frappe | 5.3 |

The gross composition of the above is as follows:

| | |
|---|---|
| Protein | 16.4% |
| Carbohydrate | 57.0 |
| Fat | 8.4 |

The formula for the fondant was as follows:

| | |
|---|---|
| Sucrose | 66.6% |
| Corn Syrup | 16.7 |
| Water | 16.7 |

The above fondant ingredients were combined and cooked to 242° F. The resulting syrup was then cooled to 100° F. in a fondant mixer and the batch beaten to the required consistency.

The formula for the frappe was as follows:

| | |
|---|---|
| Egg Albumen (Powdered) | 2.2% |
| Water | 3.9 |
| Sucrose | 38.5 |
| Corn Syrup | 51.3 |
| Water | 4.1 |

The above ingredients were processed as follows: the albumen was dissolved in water by soaking for 2 hours. The syrup was heated to 220° F. to dissolve the sucrose and then boiled to 155° F. in a mixing bowl with stirring. The albumen solution was then added and the batch beaten for 14 minutes.

The fudge bars or cores produced herein followed the same procedure as Example 1 to Step 14. At this point, the remaining ingredients, such as flavoring, vitamins, minerals, fondant and frappe were added. Lysine as desired may also be added at this point. The remaining steps were as in Example 1.

EXAMPLE 4

The fudge bars or cores produced according to Example 3 were enrobed or coated with a caramel flavored coating material. The bars were then rolled in roasted peanuts which have been chopped. Thereafter the bars were cooled to room temperature and packaged. Here again, the addition of the peanuts served to increase the protein level beyond the level produced by the solubilized protein.

EXAMPLE 5

The procedure and ingredients were the same as in Example 1 except for the introduction of the partially delactosed demineralized whey. Instead of introducing all of the whey in Step 11, one-half was introduced at this point and the remainder is introduced into Step 14. The dried whey introduced into Step 14 was first slurried with vegetable fat at 150° F. and the slurry then introduced into Step 14. To the extent that vegetable oil was introduced at this point with the whey, the amount of fat into Step 11 was reduced.

We claim:

1. A confection containing sugar, fat, partially delactosed and partially demineralized whey, water and a water soluble caseinate, the whey having an ash content of not more than about 6.5 percent, the amount of whey constituting at least about 25 percent of the sugar content and the amount of soluble caseinate comprising at least about 15 percent of the sugar content, the sugar content of the confection being at least about 45 percent.

2. A confection as in claim 1 in which the partially delactosed and partially demineralized whey has an ash content of about 0.9 to 6.5 percent, the amount of the whey being about 25 to 45 percent of the sugar content, the amount of soluble caseinate ranging from about 15 to 30 percent of the sugar content.

3. A method for the manufacture of a confection or candy comprising cooking a mix of ingredients including mainly sugar together with a soluble caseinate, partially demineralized and partially delactosed whey, fat, and water, the caseinate comprising at least about 15 percent of the sugar content and the whey comprising at least about 25 percent of the sugar content, the sugar comprising at least about 45 percent of the confection, the cooking being on a gradually increasing temperature gradient corresponding with the increasing boiling point of the mix as the mix becomes more concentrated, the cookout temperature being of the order of 227° to 235° F, then cooling the mix from the cookout temperature, forming the mix into masses of the desired size and form, and then cooling the masses to solidify the same.

4. A method as in claim 3 in which the partially delactosed and partially demineralized whey is in an amount ranging from about 24 to 45 percent of the sugar content, and in which the soluble caseinate is in an amount corresponding to about 15 to 30 percent of the sugar content.

5. A method as in claim 3 in which a part of the demineralized whey is added to the mix before cooking and the remaining part added to the mix after cooking.

6. A method as in claim 3 in which some of the partially delactosed demineralized whey is introduced into the mix before cooking, and the remaining part introduced into the mix after cooking.

* * * * *